(12) United States Patent
Sun et al.

(10) Patent No.: US 11,706,630 B2
(45) Date of Patent: Jul. 18, 2023

(54) SPECTRUM MANAGEMENT DEVICE, SYSTEM AND METHOD, AND COMPUTER-READABLE STORAGE MEDIUM

(71) Applicant: Sony Corporation, Tokyo (JP)

(72) Inventors: Chen Sun, Beijing (CN); Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 26 days.

(21) Appl. No.: 16/965,604

(22) PCT Filed: May 31, 2019

(86) PCT No.: PCT/CN2019/089444
§ 371 (c)(1),
(2) Date: Jul. 29, 2020

(87) PCT Pub. No.: WO2019/233346
PCT Pub. Date: Dec. 12, 2019

(65) Prior Publication Data
US 2021/0044984 A1  Feb. 11, 2021

(30) Foreign Application Priority Data
Jun. 7, 2018  (CN) .......................... 201810580831.9

(51) Int. Cl.
*H04W 16/14* (2009.01)
*H04W 72/04* (2023.01)
(Continued)

(52) U.S. Cl.
CPC ....... *H04W 16/14* (2013.01); *H04W 72/0453* (2013.01); *H04W 72/53* (2023.01)

(58) Field of Classification Search
CPC . H04W 16/14; H04W 72/04; H04W 72/0453; H04W 72/0493; H04W 72/044
See application file for complete search history.

(56) References Cited

U.S. PATENT DOCUMENTS

2014/0128088 A1* 5/2014 Farhadi ................. H04W 24/02
455/452.1
2014/0155079 A1* 6/2014 Xu ........................ H04L 5/0067
455/452.2
(Continued)

FOREIGN PATENT DOCUMENTS

CN  102098680 A  6/2011
CN  104796902 A  7/2015
(Continued)

OTHER PUBLICATIONS

International Search Report and Written Opinion dated Jul. 25, f2019 for PCT/CN2019/089444 filed on May 31, 2019, 8 pages including English Translation of the International Search Report.

*Primary Examiner* — Jinsong Hu
*Assistant Examiner* — Farideh Madani
(74) *Attorney, Agent, or Firm* — Xsensus LLP

(57) ABSTRACT

The present disclosure relates to a spectrum management device, system and method, and a computer-readable storage medium. The spectrum management device according to the present disclosure includes a processing circuit, configured to: determining a first interference relationship diagram between coexisting groups consisting of one or more subsystems, wherein the points in the first interference relationship diagram represent the coexisting groups, the line between two points represents that interference exists between two coexisting groups represented by the two points; and allocating a spectrum resource for each of the multiple coexisting groups according to the first interference relationship diagram, so that two coexisting groups represented by two points not connected by a line use a same spectrum resource, and two coexisting groups represented by two points connected by a side use different spectrum resources.

16 Claims, 6 Drawing Sheets

(51) Int. Cl.
*H04W 72/0453* (2023.01)
*H04W 72/53* (2023.01)

(56) References Cited

U.S. PATENT DOCUMENTS

| | | | | |
|---|---|---|---|---|
| 2015/0079974 | A1* | 3/2015 | Farhadi | H04W 16/14 |
| | | | | 455/426.1 |
| 2018/0242165 | A1* | 8/2018 | MacMullan | H04W 52/367 |
| 2019/0090279 | A1* | 3/2019 | Sun | H04W 72/0446 |
| 2021/0044984 | A1* | 2/2021 | Sun | H04W 72/0493 |

FOREIGN PATENT DOCUMENTS

| | | |
|---|---|---|
| CN | 105722236 A | 6/2016 |
| CN | 106375057 A | 2/2017 |

* cited by examiner

SPECTRUM MANAGEMENT DEVICE, SYSTEM AND METHOD, AND COMPUTER-READABLE STORAGE MEDIUM

CROSS-REFERENCE TO RELATED APPLICATIONS

The present application is based on PCT filing PCT/CN2019/089444, filed May 31, 2019, which claims priority to Chinese Patent Application No. 201810580831.9, filed Jun. 7, 2018 with the Chinese Patent Office, each of which is incorporated herein by reference in its entirety.

FIELD

Embodiments of the present disclosure generally relates to the field of wireless communications, and in particular to a spectrum management device, a spectrum management system, a spectrum management method and a computer readable storage medium.

BACKGROUND

With the development of wireless communication systems, users have increasingly high demands for services having high quality, high-speed and new services. Operators and device manufacturers are required to continually improve the system to meet user demands. Therefore, a large number of spectrum resources are required. However, limited spectrum resources are allocated to fixed operators and services, and a new available spectrum is very scarce and expensive. In this case, a concept of dynamic spectrum utilization is proposed. That is, spectrum resources allocated to certain services but not fully used are dynamically used. For example, a spectrum of a channel on which there is no program on a digital television broadcast spectrum may be dynamically used to perform wireless mobile communication without interfering with reception of a television signal.

In this application example, since the television broadcast spectrum is allocated to a television broadcast system, the television broadcast system is a primary system, and a television is a primary user. A mobile communication system may be referred to as a secondary system, and a user in the mobile communication system may be referred to as a secondary user. That is, a primary system may be a system that has a right to use a spectrum. A user in the primary system may be referred to as a primary user. A secondary system may be a system that has no right to use a spectrum and only properly uses the spectrum when a primary system to which the spectrum is allocated does not use the spectrum. In addition, the primary system and the secondary system may be systems each have a right to use a spectrum but have different priorities in spectrum utilization.

Due to limited spectrum resources available to the secondary system, it is required to propose a technical solution to reasonably allocate spectrum resources to the secondary system, so that secondary systems can more effectively use resources without interfering with each other.

SUMMARY

The summary part provides a general summary of the present disclosure, rather than a comprehensive disclosure of a full scope or all features of the present disclosure.

An object of the present disclosure is to provide a spectrum management device, a spectrum management system, a spectrum management method and a computer readable storage medium, to reasonably allocate spectrum resources for a secondary system, so that secondary systems can effectively use resources without interfering with each other.

According to an aspect of the present discourse, a spectrum management device is provided. The spectrum management device includes processing circuitry. The processing circuitry is configured to: determine a first interference relation diagram among multiple coexistence groups each including one or more secondary systems, where in the first interference relation diagram points represent coexistence groups, and a line between two points represents presence of interference between two coexistence groups represented by the two points; and allocate spectrum resources for each of the multiple coexistence groups based on the first interference relation diagram, such that two coexistence groups represented by two points not connected by a line use the same spectrum resources, and two coexistence groups represented by two points connected by a line use different spectrum resources.

According to another aspect of the present discourse, a spectrum management system is provided. The spectrum management system includes secondary systems, a primary spectrum management device and one or more secondary spectrum management devices. The secondary systems form multiple coexistence groups. The primary spectrum management device is configured to: determine a first interference relation diagram among the multiple coexistence groups, where in the first interference relation diagram points represent coexistence groups, and a line between two points represents presence of interference between two coexistence groups represented by the two points; and allocate spectrum resources for each of the multiple coexistence groups based on the first interference relation diagram, such that two coexistence groups represented by two points not connected by a line use the same spectrum resources, and two coexistence groups represented by two points connected by a line use different spectrum resources. The one or more secondary spectrum management devices are each configured to receive, from the primary spectrum management device, spectrum resources allocated for the coexistence group managed by the secondary spectrum management device.

According to another aspect of the present discourse, a spectrum management method is provided. The spectrum management method includes: determining a first interference relation diagram among multiple coexistence groups each including one or more secondary systems, where in the first interference relation diagram points represent coexistence groups, and a line between two points represents presence of interference between two coexistence groups represented by the two points; and allocating spectrum resources for each of the multiple coexistence groups based on the first interference relation diagram, such that two coexistence groups represented by two points not connected by a line use the same spectrum resources, and two coexistence groups represented by two points connected by a line use different spectrum resources.

According to another aspect of the present discourse, a spectrum management method is provided. The spectrum management method includes: determining a primary spectrum management device and a secondary spectrum management device; determining, by the primary spectrum management device, a first interference relation diagram among multiple coexistence groups each including one or more secondary systems, where in the first interference relation diagram points represent coexistence groups, and a line between two points represents presence of interference between two coexistence groups represented by the two points; allocating, by the primary spectrum management device, spectrum resources for each of the multiple coexistence groups based on the first interference relation diagram, such that two coexistence groups represented by two points not connected by a line use the same spectrum resources, and two coexistence groups represented by two points connected by a line use different spectrum resources; and transmitting, by the primary spectrum management device, spectrum resources allocated for each coexistence group to a secondary spectrum management device that performs management on the coexistence group.

According to another aspect of the present discourse, a computer readable storage medium including executable computer instructions is provided. The executable computer instructions, when being executed by a computer, cause the computer to perform the spectrum management methods according to the present discourse.

With the spectrum management device, the spectrum management system, the spectrum management method and the computer readable storage medium according to the present disclosure, spectrum resources may be allocated for coexistence groups according to an interference relation diagram, such that two coexistence groups not interfering with each other can use the same spectrum resources and two coexistence groups interfering with each other can use different spectrum resources. In this way, spectrum resources can be reasonably allocated to a secondary system, so that secondary systems can more effectively use resources without interfering with each other.

A further applicable field becomes apparent from the description herein. The description and specific examples in the summary are only illustrative and are not intended to limit the scope of the present disclosure.

BRIEF DESCRIPTION OF THE DRAWINGS

The drawings described herein are used for illustrating the selected embodiments only rather than all of possible embodiments, and are not intended to limit the scope of the present disclosure. In the drawings.

Figure 1:
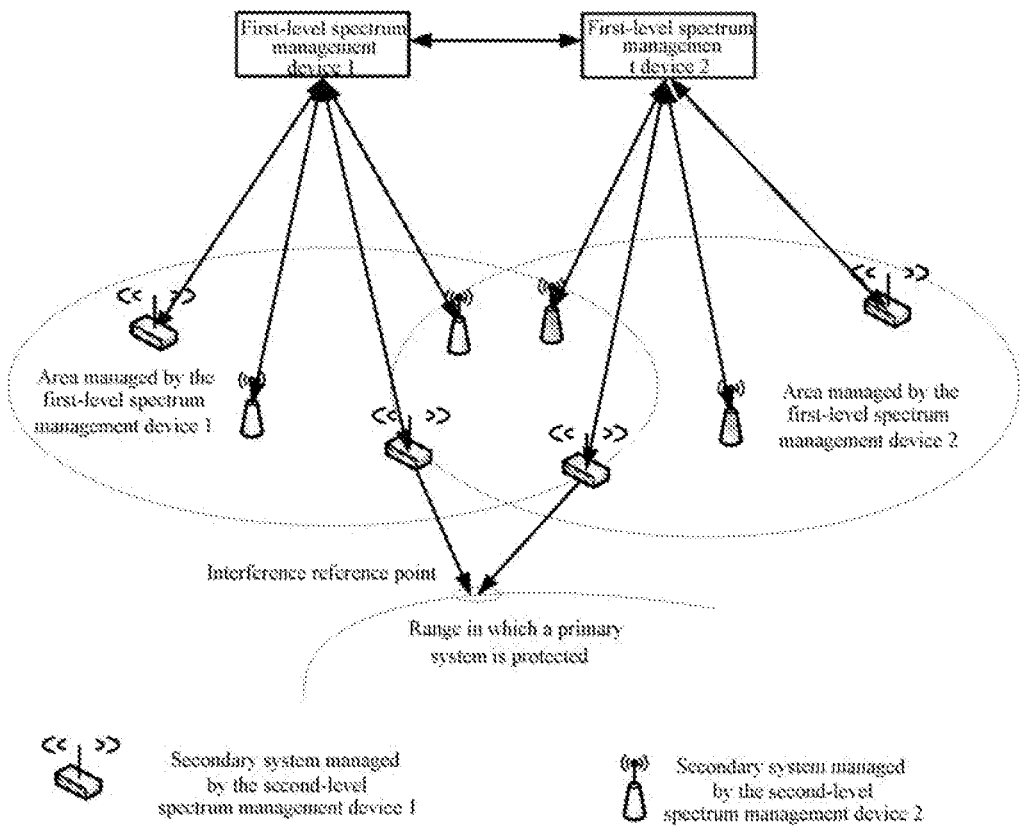
FIG. 1 is a schematic diagram showing a framework between a spectrum management device and a secondary system according to an embodiment of the present disclosure.

Although the present disclosure is susceptible to various modifications and substitutions, specific embodiments thereof are shown in the drawings as examples and are described in detail herein. However, it should be understood that the description of specific embodiments herein is not intended to limit the present disclosure into a disclosed specific form. Instead, the present disclosure aims to cover all modifications, equivalents and substitutions within the spirit and the scope of the present disclosure. It should be noted that, corresponding reference numerals indicate corresponding components throughout the drawings.

DETAILED DESCRIPTION OF EMBODIMENTS

Now, examples of the present disclosure are described more fully with reference to the drawings. The following description is merely illustrative in nature and is not intended to limit the present disclosure and application or use.

Exemplary embodiments are provided so that the present disclosure can become exhaustive and the scope of the present disclosure can be fully conveyed to those skilled in the art. Examples of various specific details such as specific components, apparatuses, and methods are set forth to provide detailed understanding of the embodiments of the present disclosure. It is apparent to those skilled in the art that without specific details, the exemplary embodiments may be implemented in multiple different forms, none of which is construed as limiting the scope of the present disclosure. In some exemplary embodiments, well-known processes, well-known structures, and well-known technologies are not described in detail.

Exemplary embodiments are described in the following order:
1. Description of a scenario
2. Configuration example of a spectrum management device
3. Configuration example of a spectrum management system
4. Embodiment of a spectrum management method
5. Application example 1. Description of a Scenario FIG. 1 is a schematic diagram showing a framework between a spectrum management device and a secondary system according to an embodiment of the present disclosure. As shown in FIG. 1, there are two first-level spectrum management devices around a range in which a primary system is protected. An area managed by a first-level spectrum management device 1 includes six secondary systems, three of which are managed by a second-level spectrum management device 1, and the other three secondary systems are managed by a second-level spectrum management device 2. An area managed by a first-level spectrum management device 2 includes five secondary systems, three of which are managed by the second-level spectrum management device 2 and two secondary systems are managed by the second-level spectrum management device 1. The area managed by the first-level spectrum management device 1 overlaps the area managed by the first-level spectrum management device 2.

According to an embodiment of the present disclosure, the first-level spectrum management device (which is also referred to as a first spectrum management device herein) may be a spectrum management device determined based on a geographic position. Each first-level spectrum management device may manage a secondary system in a certain area. For example, the first-level spectrum management device may be a spectrum allocation functional module provided by a geographic location database operator authorized according to national laws and regulations. The second-level spectrum management device (which is also referred to as a second spectrum management device herein) may be a spectrum management device regulating spectrum utilization of a secondary system within an available spectrum resource range. For example, the second-level spectrum management device may be an operator, a network provider or a network management organization of an office area, a residential area or a university campus.

According to an embodiment of the present disclosure, the first-level spectrum management device may determine a spectrum resource available to a secondary system based on interference on the primary system. After the secondary system acquires an available spectrum resource, the second-level spectrum management device regulates spectrum utilization of the secondary system within the available spectrum resource range. A group of secondary systems managed by the second-level spectrum device may be referred to as a coexistence group. The second-level spectrum management device may allocate a spectrum for the secondary system based on acquired spectrum resources available to the coexistence group.

According to an embodiment of the present disclosure, the first-level spectrum management device may be a spectrum access system (SAS). The second-level spectrum management device may be a coexistence manager (CxM). A first-level spectrum management device may communicate with another first-level spectrum management device. A second-level spectrum management device may communicate with another second-level spectrum management device via a first-level spectrum management device.

According to an embodiment of the present disclosure, the first-level spectrum management device and the second-level spectrum management device may also be implemented as one spectrum management device for example, the SAS or the CxM.

With respect to this scenario, a spectrum management device, a spectrum management system, a spectrum management method and a computer readable storage medium are provided according to the present disclosure, so as to reasonably allocate resources for a secondary system within a certain range around the primary system.

2. Configuration Example of a Spectrum Management Device

Figure 2:
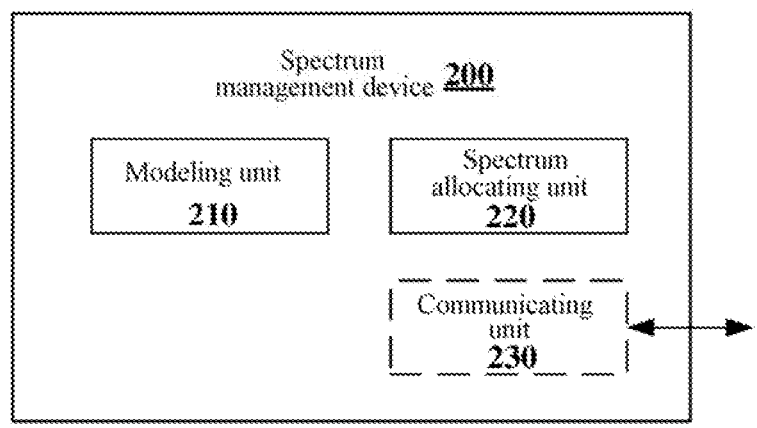
FIG. 2 is a block diagram showing a configuration example of a spectrum management device according to an embodiment of the present disclosure.

FIG. 2 is a block diagram showing a configuration example of a spectrum management device 200 according to an embodiment of the present disclosure. The spectrum management device 200 may be the second spectrum management device described above, and is preferably the CxM.

As shown in FIG. 2, the spectrum management device 200 may include a modeling unit 210 and a spectrum allocating unit 220.

Here, units of the spectrum management device 200 may be included in processing circuitry. It should be noted that the spectrum management device 200 may include one processing circuitry or multiple processing circuitry. Further, the processing circuitry may include various separate functional units to perform various different functions and/or operations. It should be noted that these functional units may be physical entities or logical entities, and units with different names may be implemented by one physical entity.

According to an embodiment of the present disclosure, the modeling unit 210 may determine a first interference relation diagram among multiple coexistence groups each including one or more secondary systems. In the first interference relation diagram, points represent coexistence groups, and a line between two points represents presence of interference between two coexistence groups represented by the two points.

According to an embodiment of the present disclosure, the spectrum allocating unit 220 may allocate spectrum resources for each of the multiple coexistence groups based on the first interference relation diagram, such that two coexistence groups represented by two points not connected by a line use the same spectrum resources.

According to an embodiment of the present disclosure, the spectrum allocating unit 220 may allocate spectrum resources for each coexistence group, such that two coexistence groups represented by two points connected by a line use different spectrum resources.

It can be seen that according to an embodiment of the present disclosure, the spectrum management device 200 may allocate spectrum resources for coexistence groups based on the first interference relation diagram representing an interference relation among coexistence groups, such that two coexistence groups not interfering with each other use the same spectrum resources and two coexistence groups interfering with each other use different spectrum resources. In this way, utilization of spectrum resources can be improved, thereby reasonably allocating spectrum resources for the coexistence groups.

Figure 3:
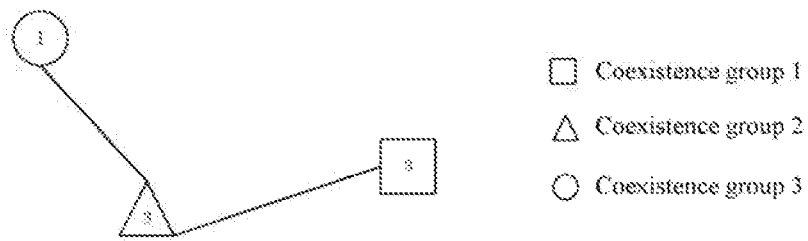
FIG. 3 shows a first interference relation diagram according to an embodiment of the present disclosure.

FIG. 3 shows a first interference relation diagram according to an embodiment of the present disclosure. As shown in FIG. 3, a square, a circle and a triangle represent three coexistence groups respectively. The square represents a coexistence group 1. The triangle represents a coexistence group 2. The circle represents a coexistence group 3. Further, the coexistence group 1 is connected to the coexistence group 2 by a line, which indicates that there is presence of interference between the coexistence group 1 and the coexistence group 2. The coexistence group 2 is connected to the coexistence group 3 by a line, which indicates that there is presence of interference between the coexistence group 2 and the coexistence group 3. The coexistence group 1 is not connected to the coexistence group 3 by a line, which indicates that there is no presence of interference between the coexistence group 1 and the coexistence group 3.

According to an embodiment of the present disclosure, the spectrum allocating unit 220 may allocate spectrum resources for the coexistence groups based on the interference relation diagram as shown in FIG. 3. Since the coexistence group 1 is not connected to the coexistence group 3 by a line, the coexistence group 1 and the coexistence group 3 may use the same spectrum resources. As shown in FIG. 3, since the coexistence group 1 is connected to the coexistence group 2 by a line, that is, there is presence of interference between the coexistence group 1 and the coexistence group 2, the spectrum allocating unit 220 may allocate different spectrum resources for the coexistence group 1 and the coexistence group 2. Similarly, since the coexistence group 2 is connected to the coexistence group 3 by a line, that is, there is presence of interference between the coexistence group 2 and the coexistence group 3, the spectrum allocating unit 220 may allocate different spectrum resources for the coexistence group 2 and the coexistence group 3.

It can be seen that, the spectrum allocating unit 220 may allocate resources for the coexistence groups, so as to allocate different spectrum resources for coexistence groups interfering with each other and allocates the same spectrum resources for coexistence groups not interfering with each other. In this way, the coexistence groups can effectively use resources without interfering with each other.

According to an embodiment of the present disclosure, the spectrum allocating unit 220 may use a coloring method in the graph theory when allocating spectrum resources. As is well-known, a graph coloring problem (GCP) is one of the most famous problems. In a given undirected graph, the graph coloring problem is that vertices of the undirected graph are divided into K color groups such that each of the groups forms an independent set with no adjacent vertices. In an optimized version of the graph coloring problem, a minimum of K is desired to be acquired.

According to an embodiment of the present disclosure, the spectrum allocating unit 220 may divide points in the first interference relation diagram into multiple color groups by using the coloring method. That is, there are no adjacent points in each color group and the number of the color groups is minimum. Further, the spectrum allocating unit 220 may allocate spectrum resources based on the color groups. For example, coexistence groups represented by points in a same color group may use the same spectrum resources, and coexistence groups represented by points in different color groups may use different spectrum resources.

In the example shown in FIG. 3, the spectrum allocating unit 220 may divide the coexistence group 1, the coexistence group 2 and the coexistence group 3 into two color groups C1 and C2 by using the coloring method. The color group C1 includes the coexistence group 1 and the coexistence group 3. The color group C2 includes the coexistence group 2.

According to an embodiment of the present disclosure, the spectrum allocating unit 220 may further determine a weight of each color group and allocate spectrum resources for coexistence groups represented by points in each color group based on the weight of each color group. That is, the spectrum allocating unit 220 may determine weights of the color group C1 and the color group C2 and allocate spectrum resources for the color group C1 and the color group C2 based on the weights of the color group C1 and the color group C2.

According to an embodiment of the present disclosure, the spectrum allocating unit 220 may determine a weight of each color group based on weights of multiple coexistence groups represented by multiple points in the color group. That is, the spectrum allocating unit 220 may determine a weight of the color group C1 based on weights of the coexistence group 1 and the coexistence group 3 and determine a weight of the color group C2 based on a weight of the coexistence group 2.

According to an embodiment of the present disclosure, the spectrum allocating unit 220 may determine a maximum value of the weights of the multiple coexistence groups represented by the multiple points in each color group as the weight of the color group.

As shown in FIG. 3, a number in each of the circle, the square and the triangle represents a weight of a coexistence group represented by the shape. For example, a weight of the coexistence group 1 is 3. A weight of the coexistence group 2 is 3. A weight of the coexistence group 3 is 1. As described above, according to an embodiment of the present disclosure, the weight of the coexistence group 1 is 3. The weight of the coexistence group 3 is 1. The maximum value of the two weights is 3. Therefore, the spectrum allocating unit 220 may determine the weight of the color group C1 to be 3. Since the weight of the coexistence group 2 is 3, the spectrum allocating unit 220 may determine the weight of the color group C2 to be 3.

Figure 4:
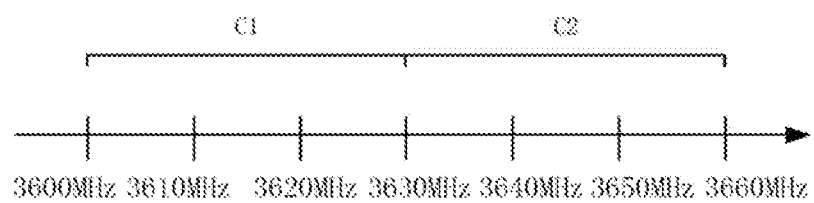
FIG. 4 is a schematic diagram showing a process of allocating spectrum resources for coexistence groups according to an embodiment of the present disclosure.

FIG. 4 is a schematic diagram showing a process of allocating spectrum resources for coexistence groups according to an embodiment of the present disclosure. As shown in FIG. 4, since weights of the color group C1 and the color group C2 are both 3, available spectrum resources may be divided into six equal parts, three of which are allocated to the color group C1 and the other three are allocated to the color group C2. That is, the coexistence group 1 and the coexistence group 3 included in the color group C1 may use spectrum resources ranging from 3600 MHz to 3630 MHz, and the coexistence group 2 included in the color group C2 may use spectrum resources ranging from 3630 MHx to 3660 MHz.

As described above, according to an embodiment of the present disclosure, the spectrum allocating unit 220 may allocate spectrum resources for a coexistence group in a color group based on a weight of the color group, such that magnitude of the allocated spectrum resources is directly proportionate to the weight.

According to an embodiment of the present disclosure, the modeling unit 210 may determine the first interference relation diagram based on a second interference relation diagram representing interference relation among the secondary systems. Here, the second interference relation diagram may represent interference relation among all secondary systems included in the multiple coexistence groups. Points in the second interference relation diagram represent secondary systems and a line between two points represents presence of interference between two secondary systems represented by the two points.

According to an embodiment of the present disclosure, the modeling unit 210 may generate the second interference relation diagram and determine the first interference relation diagram based on the second interference relation diagram.

As shown in FIG. 3, the spectrum management device 200 may further include a communicating unit 230, which is configured to communicate with another device. According to an embodiment of the present disclosure, the modeling unit 210 may acquire information of all secondary systems within a certain range around the primary system via the communicating unit 230. The information includes but is not limited to power information and position information of a secondary system and information of a coexistence group including the secondary system. In a case that the spectrum management device 200 is a second spectrum management device, for example, the CxM, the spectrum management device 200 may acquire information of the secondary systems from a first spectrum management device (for example, the SAS) performing management on the secondary system. Further, the modeling unit 210 may determine an interference relation among secondary systems based on information of the secondary systems. For example, the modeling unit 210 may calculate an interference range of a secondary system based on a position and power of the secondary system, thereby determining which secondary system or secondary systems the secondary system interferes with. That is, the modeling unit 210 may determine whether there is presence of interference between any two secondary systems, thereby generating the second interference relation diagram.

According to an embodiment of the present disclosure, the modeling unit 210 may further acquire the second interference relation diagram from a first spectrum management device for example, the SAS, and determine the first interference relation diagram based on the second interference relation diagram.

Here, all SASs within a certain range around the primary system may exchange information of secondary systems respectively managed by these SASs. The information includes but is not limited to power information and position information of the secondary system and information of a coexistence group including the secondary system, such that any one SAS can determine the interference relation among these secondary systems, thereby generating the second interference relation diagram. Further, an SAS that generates the second interference relation diagram may transmit the second interference relation diagram to the spectrum management device 200.

Figure 5:
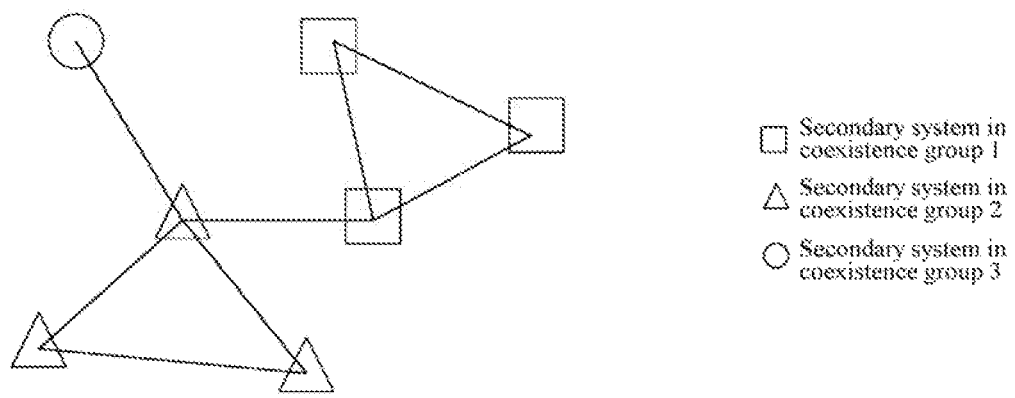
FIG. 5 shows a second interference relation diagram according to an embodiment of the present disclosure.

FIG. 5 shows a second interference relation diagram according to an embodiment of the present disclosure. As shown in FIG. 5, a square represents a secondary system in a coexistence group 1. The coexistence group 1 includes three secondary systems. A triangle represents a secondary system in a coexistence group 2. The coexistence group 2 includes three secondary systems. A circle represents a secondary system in a coexistence group 3. The coexistence group 3 includes one secondary system. In a case that two secondary systems are connected to each other by a line, there is presence of interference between the two secondary systems. In a case that two secondary systems are not connected to each other by a line, there is no presence of interference between the two secondary systems. There may be multiple cases presence of interference between the two secondary systems. For example, in a case that any one of the two secondary systems interferes with the other of the two secondary systems, it is determined that there is presence of interference between the two secondary systems. For another example, a degree of interference between a secondary system A and a secondary system B may be determined based on a degree of interference caused by the secondary system A to the secondary system B and a degree of interference caused by the secondary system B to the secondary system A, thereby determining whether there is a line between the secondary system A and the secondary system B. A manner in which a line in the second interference relation diagram is determined is not limited in the present disclosure.

According to an embodiment of the present disclosure, the modeling unit 210 may model the second interference relation diagram as shown in FIG. 5 as the first interference relation diagram as shown in FIG. 3.

According to an embodiment of the present disclosure, the modeling unit 210 may determine a point in the first interference relation diagram. For example, the modeling unit 210 may merge all secondary systems in each coexistence group in the second interference relation diagram into one point to represent the coexistence group. As shown in FIG. 3, three secondary systems included in the coexistence group 1 shown in FIG. 5 are merged into one point to represent the coexistence group 1. Three secondary systems included in the coexistence group 2 shown in FIG. 5 are merged into one point to represent the coexistence group 2. One secondary system included in the coexistence group 3 shown in FIG. 5 represents the coexistence group 3.

According to an embodiment of the present disclosure, the modeling unit 210 may determine a line in the first interference relation diagram. For example, in a case that there is presence of interference between any secondary system in the first coexistence group and any secondary system in the second coexistence group, the modeling unit 210 determines that there is presence of interference between the first coexistence group and the second coexistence group. That is, the modeling unit 210 determines that there is a line between a point representing the first coexistence group and a point representing the second coexistence group in the first interference relation diagram. As shown in FIG. 5, a secondary system in the coexistence group 1 is connected to a secondary system in the coexistence group 2 by a line. That is, the two secondary systems interfere with each other. Therefore, the modeling unit 210 may determine that in the first interference relation diagram, the coexistence group 1 is connected to the coexistence group 2 by a line. None of secondary systems in the coexistence group 1 is connected to a secondary system in the coexistence group 3. Therefore, the modeling unit 210 may determine that in the first interference relation diagram, the coexistence group 1 is not connected to the coexistence group 3 by a line. A secondary system in the coexistence group 2 is connected to a secondary system in the coexistence group 3 by a line. That is, the two secondary systems interfere with each other. Therefore, the modeling unit 210 may determine that in the first interference relation diagram, the coexistence group 2 is connected to the coexistence group 3 by a line.

According to an embodiment of the present disclosure, the modeling unit 210 may further determine a weight of each point, that is, each coexistence group, in the first interference relation diagram. According to an embodiment of the present disclosure, the modeling unit 210 may determine the weight of the coexistence group based on a color number when performing coloring by using the coloring method on points in the second interference relation diagram which belong to the coexistence group. Here, the modeling unit 210 may similarly perform coloring on a secondary system in each coexistence group by using the coloring method. For example, in the second interference relation diagram, the coexistence group 1 includes three secondary systems interfering with each other. Therefore, the three secondary systems may be divided into three color groups, thereby determining the weight of the coexistence group 1 to be 3. The coexistence group 2 includes three secondary systems interfering with each other. Therefore, the three secondary systems may be divided into three color groups, thereby determining the weight of the coexistence group 2 to be 3. The coexistence group 3 includes one secondary system. Therefore, the secondary system may be divided into one color group, thereby determining the weight of the coexistence group 3 to be 1.

According to an embodiment of the present disclosure, when determining the weight of each coexistence group, the modeling unit 210 considers, in addition to a color number when performing coloring on a secondary system in the coexistence group, one or more of the following parameters: the number of secondary systems included in the coexistence group; and spectrum demand information of the coexistence group. For example, in addition to being directly proportional to the color number, the weight may also be directly proportional to the number of the secondary systems included in the coexistence group and/or be directly proportional to the spectrum demand of the coexistence group.

As described above, the modeling unit 210 may determine the first interference relation diagram based on the second interference relation diagram, such that the spectrum allocating unit 220 may allocate spectrum resources for each coexistence group based on the first interference relation diagram. According to an embodiment of the present disclosure, the spectrum management device 200 may be a second spectrum management device, for example, a CxM, that performs management on a coexistence group. Further, the spectrum management device 200 may transmit the spectrum resources allocated for each coexistence group to another second spectrum management device, for example, another CxM, that performs management on the coexistence group via the communicating unit 230.

According to an embodiment of the present disclosure, the spectrum management device 200 may be a primary spectrum management device among multiple second spectrum management devices, and may transmit an allocation result of spectrum resources to other secondary spectrum management devices. Here, the primary spectrum management device, for example, may be a spectrum management device within a certain range around a primary system which performs management on the maximum number of secondary systems. However, the above rule is not restrictive. The primary spectrum management device may also be determined according to other rule, for example, a parameter such as a spectrum management capability and a geographic position of a spectrum management device.

It can be seen that, according to an embodiment of the present disclosure, the spectrum management device 200 may allocate spectrum resources for coexistence groups based on the first interference relation diagram representing interference relation among the coexistence groups, such that two coexistence groups not interfering with each other use the same spectrum resources and two coexistence groups interfering with each other use different spectrum resources. In this way, utilization of spectrum resources is improved, thereby reasonably allocating spectrum resources for the coexistence groups. Further, the spectrum management device 200 may allocate spectrum resources for the coexistence groups by using the graph coloring problem, thereby improving optimization effect.

3. Configuration Example of a Spectrum Management System

Figure 6:
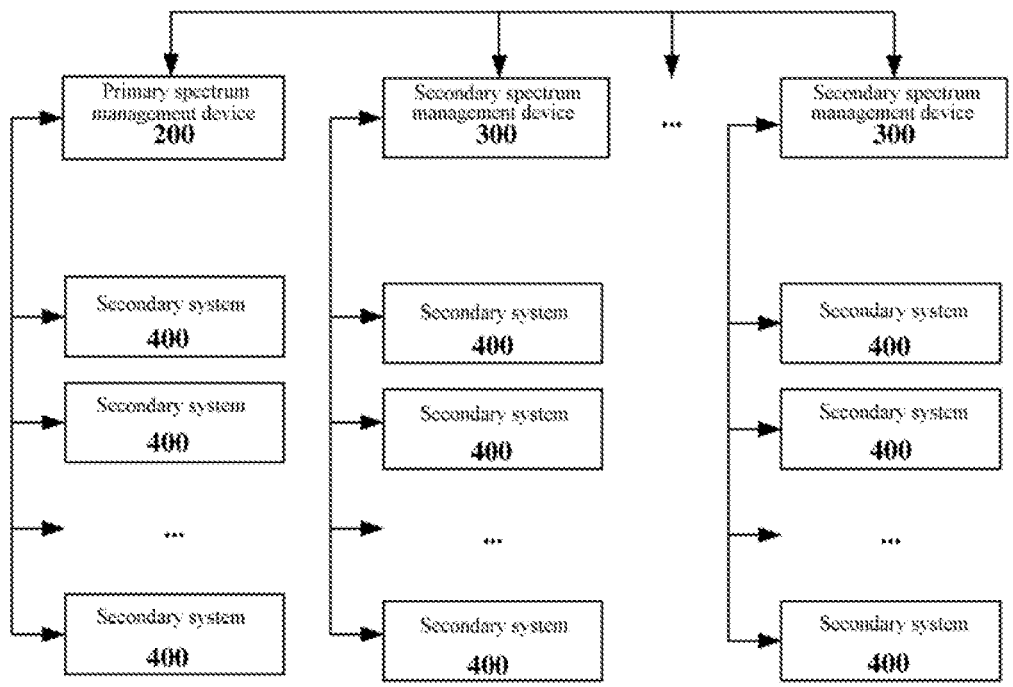
FIG. 6 is a block diagram showing a configuration example of a spectrum management system according to an embodiment of the present disclosure.

FIG. 6 is a block diagram showing a configuration example of a spectrum management system according to an embodiment of the present disclosure. As shown in FIG. 6, the spectrum management system may include a primary spectrum management device 200, one or more secondary spectrum management devices 300 and one or more secondary systems 400.

Further, each spectrum management device may manage one or more secondary systems 400. According to an embodiment of the present disclosure, multiple secondary systems 400 managed by one spectrum management device may form a coexistence group. That is, the secondary systems 400 form multiple coexistence groups.

According to an embodiment of the present disclosure, the primary spectrum management device 200 may determine a first interference relation diagram among multiple coexistence groups. In the first interference relation diagram, points represent coexistence groups, and a line between two points represents presence of interference between two coexistence groups represented by the two points. Spectrum resources may be allocated for each of the multiple coexistence groups based on the first interference relation diagram, such that two coexistence groups represented by two points not connected by a line use the same spectrum resources and two coexistence groups represented by two points connected by a line use different spectrum resources.

According to an embodiment of the present disclosure, the secondary spectrum management device 300 may receive, from the primary spectrum management device 200, spectrum resources allocated for a coexistence group managed by the secondary spectrum management device.

According to an embodiment of the present disclosure, the primary spectrum management device 200 may further transmit information of a secondary system 400 managed by the primary spectrum management device 200 to the secondary spectrum management device 300, and may receive, from the secondary spectrum management device 300, information of a secondary system 400 managed by the secondary spectrum management device 300. That is, each spectrum management device within a certain range around the primary system may transmit information of a secondary system managed by the spectrum management device to other spectrum management device within the certain range. Here, information of the secondary system includes but is not limited to position information and power information of the secondary system and information of a coexistence group including the secondary system. In addition, in a case that the primary spectrum management device 200 and the secondary spectrum management device 300 are CxMs, the primary spectrum management device 200 and the secondary spectrum management device 300 may transmit and receive information via an SAS.

According to an embodiment of the present disclosure, a second spectrum management device that performs management on the maximum number of secondary systems among all second spectrum management devices within a certain range around the primary system may be determined as the primary spectrum management device 200, and other second spectrum management device may be determined as the secondary spectrum management device 300. That is, after the second spectrum management device acquires information of secondary systems managed by all other second spectrum management devices, a second spectrum management device that performs management on the maximum number of secondary systems may be determined, thereby determining which second spectrum management device is the primary spectrum management device.

The primary spectrum management device according to the embodiment of the present disclosure may be implemented by the spectrum management device 200 described above. Therefore, all embodiments of the spectrum management device 200 described above are suitable for this embodiment.

4. Spectrum Management Method Embodiment

Next, a spectrum management method performed by the spectrum management device 200 according to an embodiment of the present disclosure is described in detail.

Figure 7:
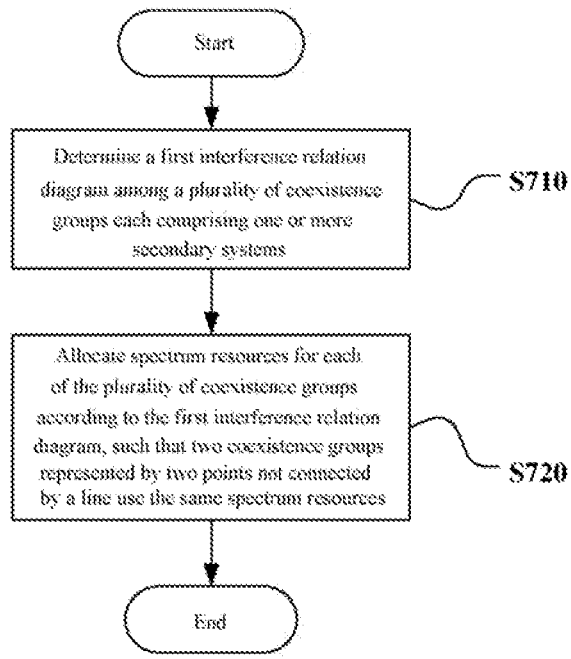
FIG. 7 is a flowchart of a spectrum management method according to an embodiment of the present disclosure.

FIG. 7 is a flowchart of a spectrum management method performed by the spectrum management device 200 according to an embodiment of the present disclosure.

As shown in FIG. 7, in step S710, a first interference relation diagram among multiple coexistence groups each including one or more secondary systems is determined. In the first interference relation diagram, points represent coexistence groups, and line between two points represents presence of interference between two coexistence groups represented by the two points.

Next, in step S720, spectrum resources are allocated for each of the multiple coexistence groups based on the first interference relation diagram, such that two coexistence groups represented by two points not connected by a line use the same spectrum resources, and two coexistence groups represented by two points connected by a line use different spectrum resources.

Preferably, determining a first interference relation diagram includes: determining, in a case that there is presence of interference between any secondary system in a first coexistence group and any secondary system in a second coexistence group, presence of interference between the first coexistence group and the second coexistence group.

Preferably, the spectrum management method further includes: dividing points in the first interference relation diagram into multiple color groups by using the coloring method, such that coexistence groups represented by points in a same color group use the same spectrum resources, and coexistence groups represented by points in different color groups use different spectrum resources.

Preferably, the spectrum management method further includes: determining a weight of each color group; and allocating spectrum resources for coexistence groups represented by points in each color group based on the weight of each color group.

Preferably, the determining a weight of each color group includes: determining a weight of the color group based on weights of multiple coexistence groups represented by multiple points in the color group.

Preferably, the determining a weight of each color group includes: determining a maximum value of the weights of the multiple coexistence groups represented by the multiple points in the color group as the weight of the color group.

Preferably, the spectrum management method further includes determining a weight of each coexistence group by: determining a second interference relation diagram among all secondary systems included in the multiple coexistence groups, where in the second interference relation diagram, points represent secondary systems, and a line between two points represents presence of interference between two secondary systems represented by the two points; and determining the weight of the coexistence group based on a color number when performing coloring by using the coloring method on points in the second interference relation diagram which belong to the coexistence group.

Preferably, the determining a weight of each coexistence group further includes determining the weight of the coexistence group based on one or more of the following parameters: the number of the secondary systems included in the coexistence group; and spectrum demand information of the coexistence group.

Preferably, the spectrum management device is a second spectrum management device that performs management on one of the multiple coexistence groups. More preferably, the spectrum management device is a coexistence manager CxM.

Preferably, the spectrum management method further includes: transmitting spectrum resources allocated for each coexistence group to another second spectrum management device that performs management on the coexistence group. More preferably, the another second spectrum management device is another CxM.

Preferably, the spectrum management method further includes: acquiring, from a first spectrum management device, for example, a spectrum access system SAS, the second interference relation diagram among all secondary systems included in the multiple coexistence groups; and determining the first interference relation diagram based on the second interference relation diagram.

According to an embodiment of the present disclosure, the above method may be performed by the spectrum management device 200 according to the embodiment of the present disclosure. Therefore, all embodiments of the spectrum management device 200 described above are suitable for this embodiment.

Figure 8:
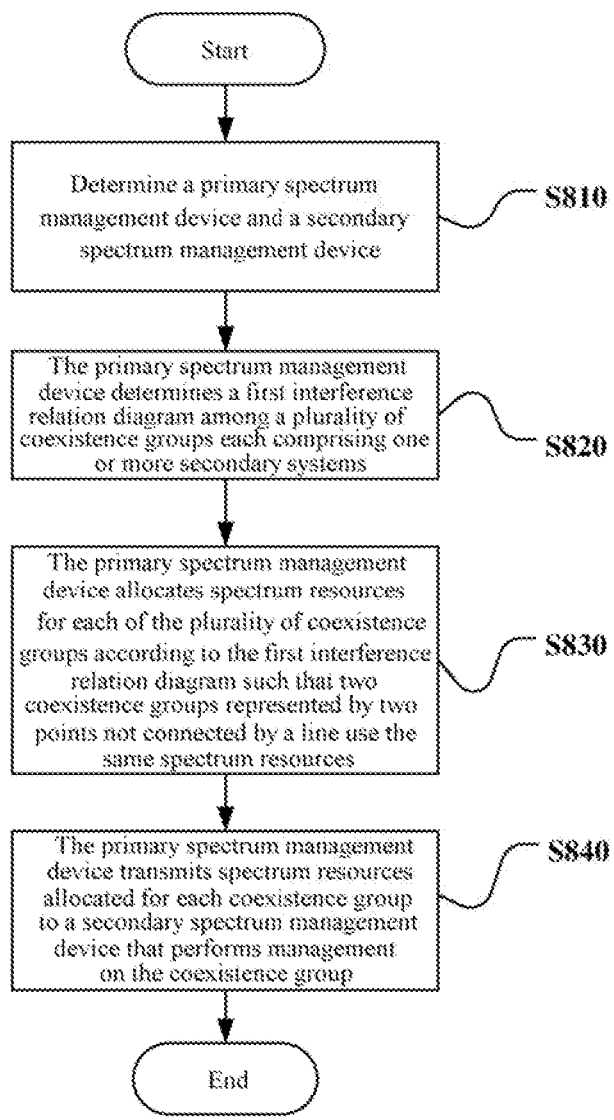
FIG. 8 is a flowchart of a spectrum management method according to another embodiment of the present disclosure.

FIG. 8 is a flowchart of a spectrum management method according to another embodiment of the present disclosure.

As shown in FIG. 8, in step S810, a primary spectrum management device and a secondary spectrum management device are determined.

Next, in step S820, the primary spectrum management device determines a first interference relation diagram among multiple coexistence groups each including one or more secondary systems. In the first interference relation diagram, points represent coexistence groups, and a line between two points represents presence of interference between two coexistence groups represented by the two points.

Next, in step S830, the primary spectrum management device allocates spectrum resources for each of the multiple coexistence groups based on the first interference relation diagram, such that two coexistence groups represented by two points not connected by a line use the same spectrum resources, and two coexistence groups represented by two points connected by a line use different spectrum resources.

Next, in step S840, the primary spectrum management device transmits spectrum resources allocated for each coexistence group to a secondary spectrum management device that performs management on the coexistence group.

Preferably, the spectrum management method further includes: determining a second spectrum management device that performs management on a maximum number of secondary systems as the primary spectrum management device; and determining other second spectrum management device as the secondary spectrum management device.

Preferably, the spectrum management method further includes: transmitting, by each second spectrum management device in the spectrum management system, information of all secondary systems managed by the second spectrum management device to other second spectrum management device, so as to determine a second spectrum management device that performs management on the maximum number of secondary systems as the primary spectrum management device.

Preferably, the determining the first interference relation diagram by the primary spectrum management device includes: determining, in a case that there is presence of interference between any secondary system in a first coexistence group and any secondary system in a second coexistence group, presence of interference between the first coexistence group and the second coexistence group.

Preferably, the spectrum management method further includes: dividing, by the primary spectrum management device, points in the first interference relation diagram into multiple color groups by using the coloring method, such that coexistence groups represented by points in a same color group use the same spectrum resources and coexistence groups represented by points in different color groups use different spectrum resources.

Preferably, the spectrum management method further includes: determining, by the primary spectrum management device, a weight of each color group; and allocating, by the primary spectrum management device, spectrum resources for coexistence groups represented by points in each color group based on the weight of each color group.

Preferably, the determining a weight of each color group by the primary spectrum management device includes: determining a weight of the color group based on weights of multiple coexistence groups represented by multiple points in the color group.

Preferably, the determining a weight of each color group by the primary spectrum management device includes: determining a maximum value of the weights of the multiple coexistence groups represented by the multiple points in the color group as the weight of the color group.

Preferably, the spectrum management method further includes determining, by the primary spectrum management device, a weight of each coexistence group by: determining a second interference relation diagram among all secondary systems included in the multiple coexistence groups, where in the second interference relation diagram points represent secondary systems, and a line between two points represents presence of interference between two secondary systems represented by the two points; and determining the weight of the coexistence group based on a color number when performing coloring by using the coloring method on points in the second interference relation diagram which belong to the coexistence group.

Preferably, the determining a weight of each coexistence group further includes: determining, by the primary spectrum management device, the weight of the coexistence group based on one or more of the following parameters: the number of the secondary systems included in the coexistence group; and spectrum demand information of the coexistence group.

Preferably, each of the primary spectrum management device and the secondary spectrum management device is a second spectrum management device that performs management on one of the multiple coexistence groups, for example, the coexistence manager CxM.

Preferably, the spectrum management method further includes: determining, by the first spectrum management device, for example, the spectrum access system SAS, the second interference relation diagram among all secondary systems included in the multiple coexistence groups, where in the second interference relation diagram points represent secondary systems, and a line between two points represents presence of interference between two secondary systems represented by the two points; acquiring, by the primary spectrum management device, the second interference relation diagram from the spectrum access system SAS; and determining, by the primary spectrum management device, the first interference relation diagram based on the second interference relation diagram.

Figure 9:
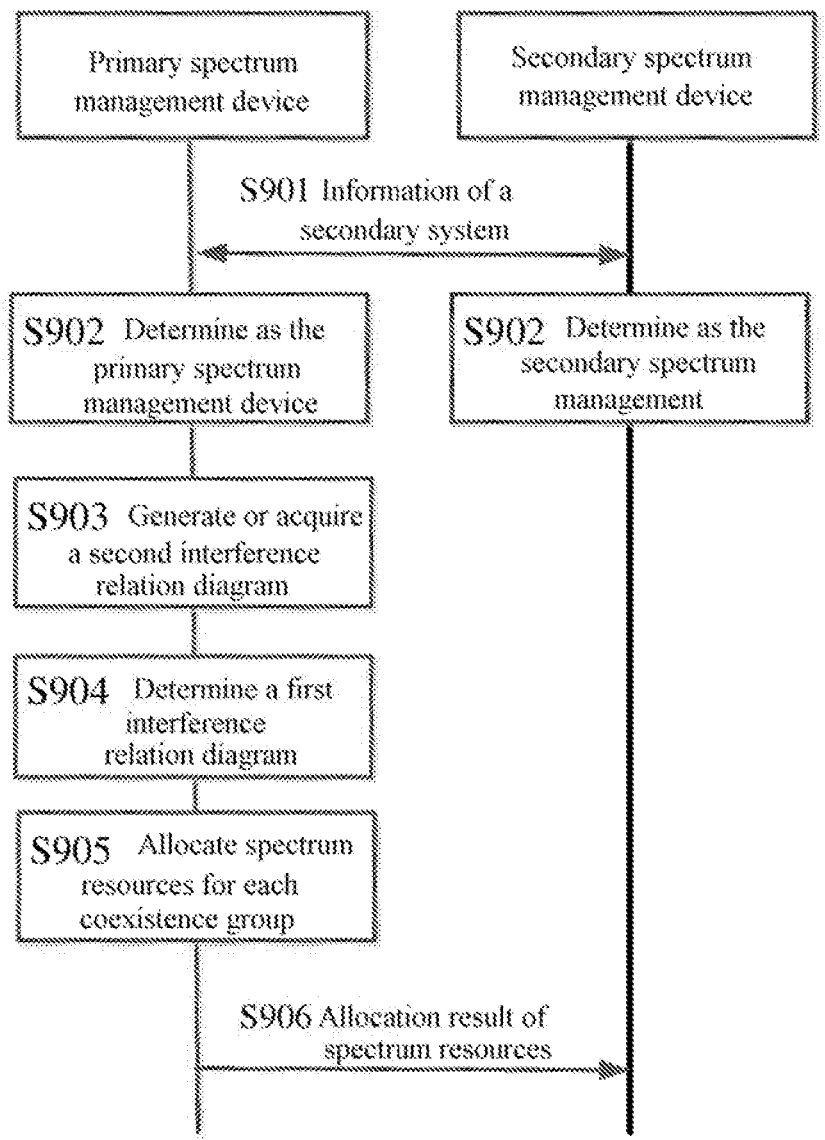
FIG. 9 is a signaling flowchart of a spectrum management method according to an embodiment of the present disclosure.

FIG. 9 shows a signaling flowchart of the spectrum management method according to an embodiment of the present disclosure.

As shown in FIG. 9, in step S901, a primary spectrum management device exchange information of a secondary system with a secondary spectrum management device. For example, the primary spectrum management device may transmit information of all secondary systems managed by the primary spectrum management device to the secondary spectrum management device, and the secondary spectrum management device may transmit information of all secondary systems managed by the secondary spectrum management device to the primary spectrum management device. In this step, the primary spectrum management device and the secondary spectrum management device are not determined. Therefore, each spectrum management device may transmit information of all secondary systems managed by the spectrum management device to other spectrum management device. Further, information of a secondary system includes but is not limited to position information and power information of the secondary system. In addition, in a case that the primary spectrum management device and the secondary spectrum management device are CxMs, the primary spectrum management device may exchange information of the secondary system with the secondary spectrum management device via an SAS. In this way, after step S901, a spectrum management device may acquire the number of secondary systems managed by each of other spectrum management device. Next, in step S902, the primary spectrum management device and the secondary spectrum management device are determined based on the number of secondary systems managed by each spectrum management device. Next, in step S903, the primary spectrum management device generates a second interference relation diagram or acquires a second interference relation diagram from the SAS. Next, in step S904, the primary spectrum management device determines a first interference relation diagram based on the second interference relation diagram. Next, in step S905, the primary spectrum management device allocates spectrum resources for each coexistence group based on the first interference relation diagram. Next, in step S906, the primary spectrum management device transmits an allocation result of spectrum resources to the secondary spectrum management device. In this way, the primary spectrum management device allocates spectrum resources for each coexistence group.

5. Application Example

The technology according to the present disclosure may be applicable to various productions.

For example, the spectrum management device 200 may be implemented as any types of servers, such as a tower server, a rack server and a blade server. The spectrum management device 200 may be a control module (such as an integrated circuitry module including a single die and a card or a blade inserted into a slot of a blade server) mounted on a server.

The secondary system may be implemented as any types of network side device, user equipment or a combination thereof. The network side device may be implemented as any types of TRP (Transmit and Receive Port), and base station device such as an eNB (Evolved Node B) and a gNB (which is a base station device in a 5G communication system). Specially, the secondary system may also be implemented as CBSD (Citizens Broadband Radio Service Devices).

Figure 10:
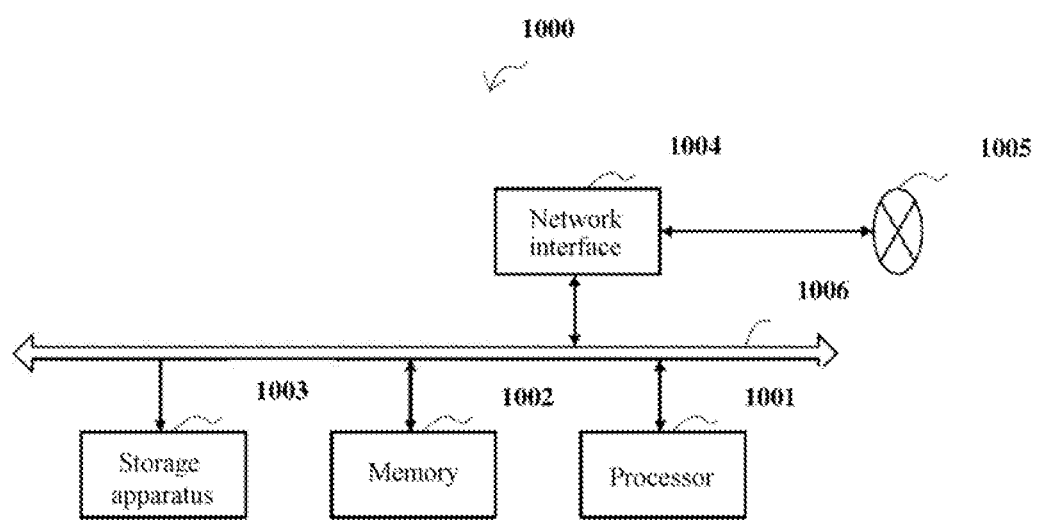
FIG. 10 is a block diagram showing an example of a server capable of implementing the spectrum management device according to the present disclosure.

FIG. 10 is a block diagram showing an example of a server 1000 capable of implementing the spectrum management device 200 according to the present disclosure. The server 1000 includes a processor 1001, a memory 1002, a storage apparatus 1003, a network interface 1004 and a bus 1006.

The processor 1001 may be, for example, a central processing unit (CPU) or a digital signal processor (DSP), and controls a function of the server 1000. The memory 1002 includes a random access memory (RAM) and a read only memory (ROM), and stores data and programs executed by the processor 1001. The storage apparatus 1003 may include a storage medium such as a semiconductor memory and a hard disk.

The network interface 1004 is a wired communication interface for connecting the server 1000 to a wired communication network 1005. The wired communication network 1005 may be a core network such as an evolved packet core network (EPC) or a packet data network (PDN) such as the Internet.

The processor 1001, the memory 1002, the storage apparatus 1003 and the network interface 1704 are connected to each other via a bus 1006. The bus 1006 may include two or more buses having different speeds (such as a high speed bus and a low speed bus).

In the server 1000 as shown in FIG. 10, the modeling unit 210 and the spectrum allocating unit 220 described with reference to FIG. 2 may be implemented by the processor 1001, and the communicating unit 230 described with reference to FIG. 2 may be implemented by the network interface 1004. For example, the processor 1001 may determine an interference relation diagram and allocate spectrum resources by executing instructions stored in the memory 1002 or the storage apparatus 1003.

Preferred embodiments of the present disclosure are described above with reference to the drawings. However, the present disclosure is not limited to above examples. Those skilled in the art may obtain various modifications and changes within the scope of the appended claims. It should understand that these modifications and changes fall within the technical scope of the present disclosure.

For example, a unit shown with a dashed-line block in functional block diagrams shown in the drawings is optional in a corresponding apparatus. Further, optional functional units may be combined in a suitable manner to achieve required functions.

For example, in the above embodiments, multiple functions included in one unit may be achieved by separate apparatuses. Alternately, in the above embodiments, multiple functions achieved by multiple units may be achieved by separate apparatuses. In addition, one of the above functions may be achieved by multiple units. These configurations should be included in the technical scope of the present disclosure.

In this specification, the steps described in the flowcharts include not only processing performed in time series in the described order but also processing performed in parallel or individually instead of in time series. In addition, the steps performed in time series may be performed in a different order.

Although the embodiments of the present disclosure are described above in detail with reference to the drawings, it should be understood that the above-described embodiments are merely used for illustrating the present disclosure rather than intended to limit the present disclosure. Those skilled in the art can make various modifications and variations to the above-described embodiments without departing from the substance and scope of the present disclosure. Therefore, the scope of the present disclosure is defined only by the appended claims and their equivalents.

The invention claimed is:

1. A spectrum management device, comprising processing circuitry configured to:
   determine a first interference relation diagram among a plurality of coexistence groups each comprising a plurality of secondary systems, each of the plurality of secondary systems comprising an access point, wherein the first interference relation diagram points represent coexistence groups, and a line between two points represents presence of interference between two coexistence groups represented by the two points;
   allocate spectrum resources for each of the plurality of coexistence groups according to the first interference relation diagram, such that two coexistence groups represented by two points not connected by a line use the same spectrum resources, and two coexistence groups represented by two points connected by a line use different spectrum resources; and
   determine a weight of each of a plurality of color groups, wherein each of the plurality of color groups comprises one or more coexistence groups and a particular color group comprises two or more coexistence groups,
   wherein the weight of the particular color group is determined to be a maximum value of weights of the two or more coexistence groups in the particular color group,
   wherein the spectrum resources are allocated for each color group according to the weight of each color group, such that a magnitude of the allocated spectrum resources for each color group is directly proportionate to the weight, and
   wherein the one or more secondary systems are mobile communication systems configured to use the allocated spectrum resources only when the allocated spectrum resources are not being used by a primary system.

2. The spectrum management device according to claim 1, wherein the processing circuitry is further configured to:
   in presence of interference between any secondary system in a first coexistence group and any secondary system in a second coexistence group, determine presence of interference between the first coexistence group and the second coexistence group.

3. The spectrum management device according to claim 1, wherein the processing circuitry is further configured to:
   divide points in the first interference relation diagram into a plurality of color groups, such that coexistence groups represented by points in a same color group use the same spectrum resources, and coexistence groups represented by points in different color groups use different spectrum resources.

4. The spectrum management device according to claim 1, wherein the processing circuitry is further configured to determine a weight of each coexistence group by:
   determining a second interference relation diagram among all the secondary systems comprised in the plurality of coexistence groups; and
   determining the weight of the coexistence group, according to a color number when performing coloring on points in the second interference relation diagram which belong to the coexistence group.

5. The spectrum management device according to claim 4, wherein the processing circuitry is further configured to determine the weight of the coexistence group according to one or more of the following parameters: the number of the secondary systems comprised in the coexistence group; and spectrum demand information of the coexistence group.

6. The spectrum management device according to claim 1, wherein the spectrum management device is a second spectrum management device that performs management on one of the plurality of coexistence groups.

7. The spectrum management device according to claim 6, wherein the processing circuitry is further configured to:
   acquire, from a first spectrum management device, the second interference relation diagram among all secondary systems comprised in the plurality of coexistence groups; and
   determine the first interference relation diagram based on the second interference relation diagram.

8. The spectrum management device according to claim 1, wherein a first coexistence group of the plurality of coexistence groups comprises at least one access point from a second coexistence group of the plurality of coexistence groups.

9. A spectrum management system, comprising:
a plurality of secondary systems forming a plurality of coexistence groups, each of the plurality of secondary systems comprising an access point;
a primary spectrum management device configured to:
determine a first interference relation diagram among the plurality of coexistence groups, wherein in the first interference relation diagram points represent coexistence groups, and a line between two points represents presence of interference between two coexistence groups represented by the two points;
determine a weight of each of a plurality of color groups, wherein each of the plurality of color groups comprises one or more coexistence groups and a particular color group comprises two or more coexistence groups, and the weight of the particular color group is determined to be a maximum value of weights of the two or more coexistence groups in the particular color group; and
allocate spectrum resources for each of the plurality of coexistence groups according to the first interference relation diagram, such that two coexistence groups represented by two points not connected by a line use the same spectrum resources, and two coexistence groups represented by two points connected by a line use different spectrum resources,
wherein the spectrum resources are allocated for each color group according to the weight of each color group, such that a magnitude of the allocated spectrum resources for each color group is directly proportionate to the weight; and
one or more secondary spectrum management devices each configured to receive, from the primary spectrum management device, spectrum resources allocated for a coexistence group managed by the secondary spectrum management device,
wherein the one or more secondary systems are mobile communication systems configured to use the allocated spectrum resources only when the allocated spectrum resources are not being used by a primary system.

10. A spectrum management method, comprising:
determining a first interference relation diagram among a plurality of coexistence groups each comprising a plurality of secondary systems, each of the plurality of secondary systems comprising an access point, wherein in the first interference relation diagram points represent coexistence groups, and a line between two points represents presence of interference between two coexistence groups represented by the two points;
determining a weight of each of a plurality of color groups, wherein each of the plurality of color groups comprises one or more coexistence groups and a particular color group comprises two or more coexistence groups, and the weight of the particular color group is determined to be a maximum value of weights of the two or more coexistence groups in the particular color group; and
allocating spectrum resources for each of the plurality of coexistence groups according to the first interference relation diagram, such that two coexistence groups represented by two points not connected by a line use the same spectrum resources and two coexistence groups represented by two points connected by a line use different spectrum resources,
wherein the spectrum resources are allocated for each color group according to the weight of each color group, such that a magnitude of the allocated spectrum resources for each color group is directly proportionate to the weight, and
wherein the one or more secondary systems are mobile communication systems configured to use the allocated spectrum resources only when the allocated spectrum resources are not being used by a primary system.

11. The spectrum management method according to claim 10, wherein the determining a first interference relation diagram comprises:
determining, in presence of interference between any secondary system in a first coexistence group and any secondary system in a second coexistence group, presence of interference between the first coexistence group and the second coexistence group.

12. The spectrum management method according to claim 10, further comprising:
dividing points in the first interference relation diagram into a plurality of color groups, such that coexistence groups represented by points in a same color group use the same spectrum resources, and coexistence groups represented by points in different color groups use different spectrum resources.

13. The spectrum management method according to claim 10, further comprising determining a weight of each coexistence group by:
determining a second interference relation diagram among all secondary systems comprised in the plurality of coexistence groups; and
determining the weight of the coexistence group based on a color number when performing coloring on points in the second interference relation diagram which belong to the coexistence group.

14. The spectrum management method according to claim 13, wherein the determining a weight of each coexistence group further comprises determining the weight of the coexistence group based on one or more of the following parameters: the number of the secondary systems comprised in the coexistence group; and spectrum demand information of the coexistence group.

15. The spectrum management method according to claim 10, wherein the spectrum management method is performed by a second spectrum management device that performs management on one of the plurality of coexistence groups.

16. The spectrum management method according to claim 15, further comprising:
acquiring, from a first spectrum management device, the second interference relation diagram among all the secondary systems comprised in the plurality of coexistence groups; and
determining the first interference relation diagram based on the second interference relation diagram.

* * * * *